Feb. 24, 1942.  R. E. HORGER  2,274,201
LOCOMOTIVE ROD BEARING SEAL
Filed Jan. 20, 1940  2 Sheets-Sheet 1
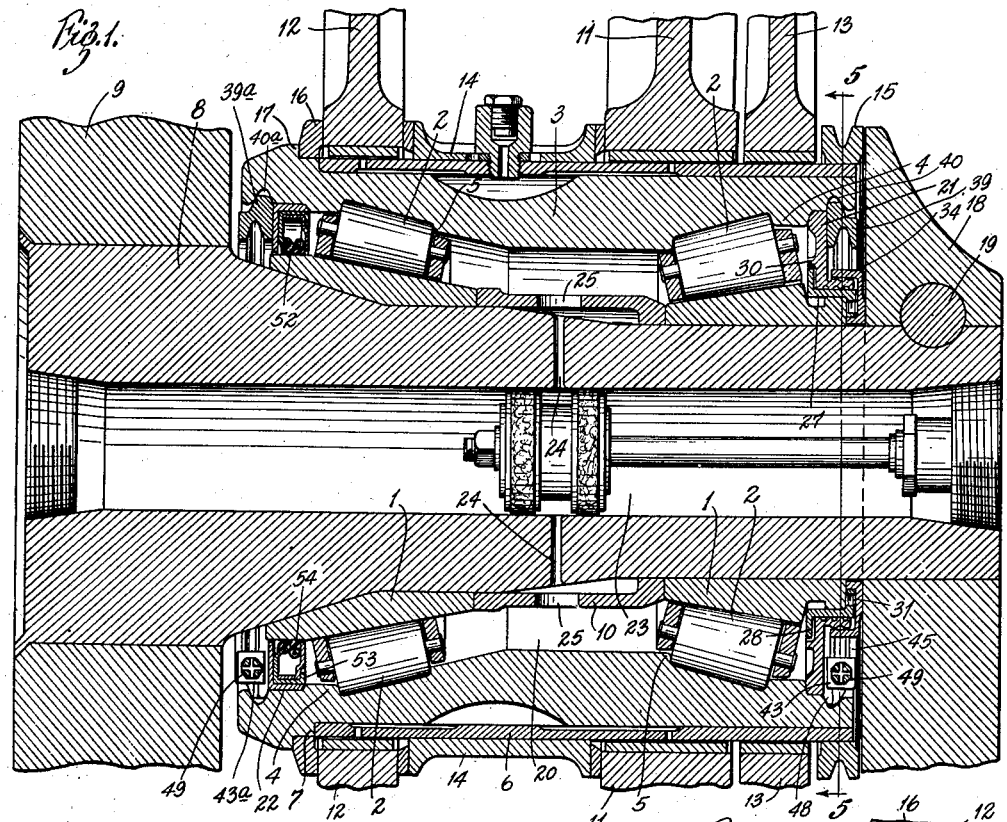
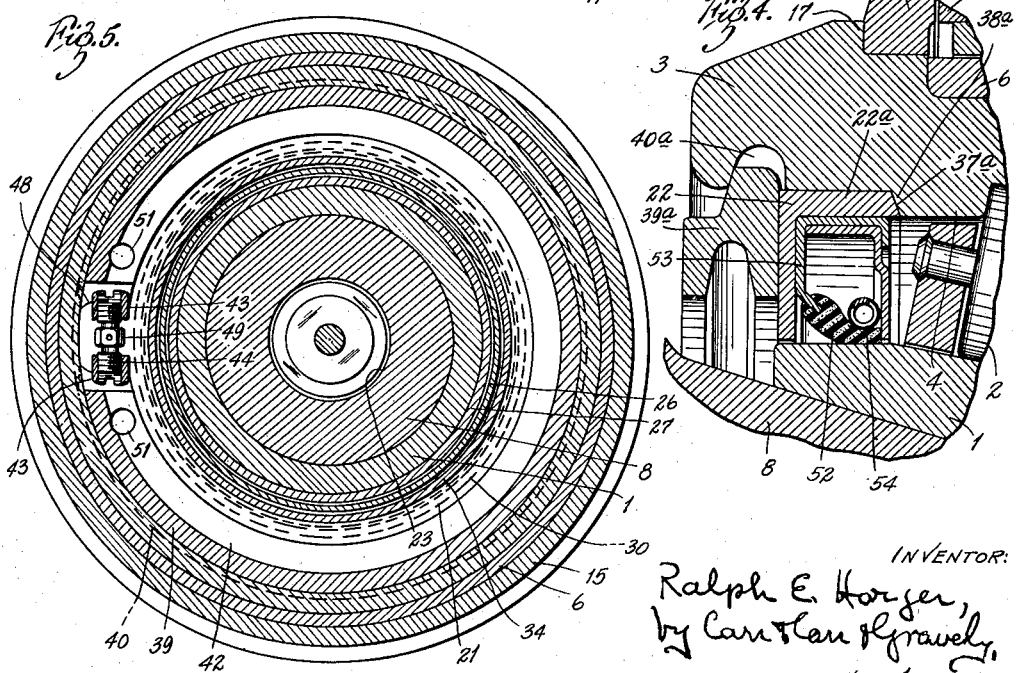
INVENTOR:
Ralph E. Horger,
by Cameron & Gravely,
HIS ATTORNEYS

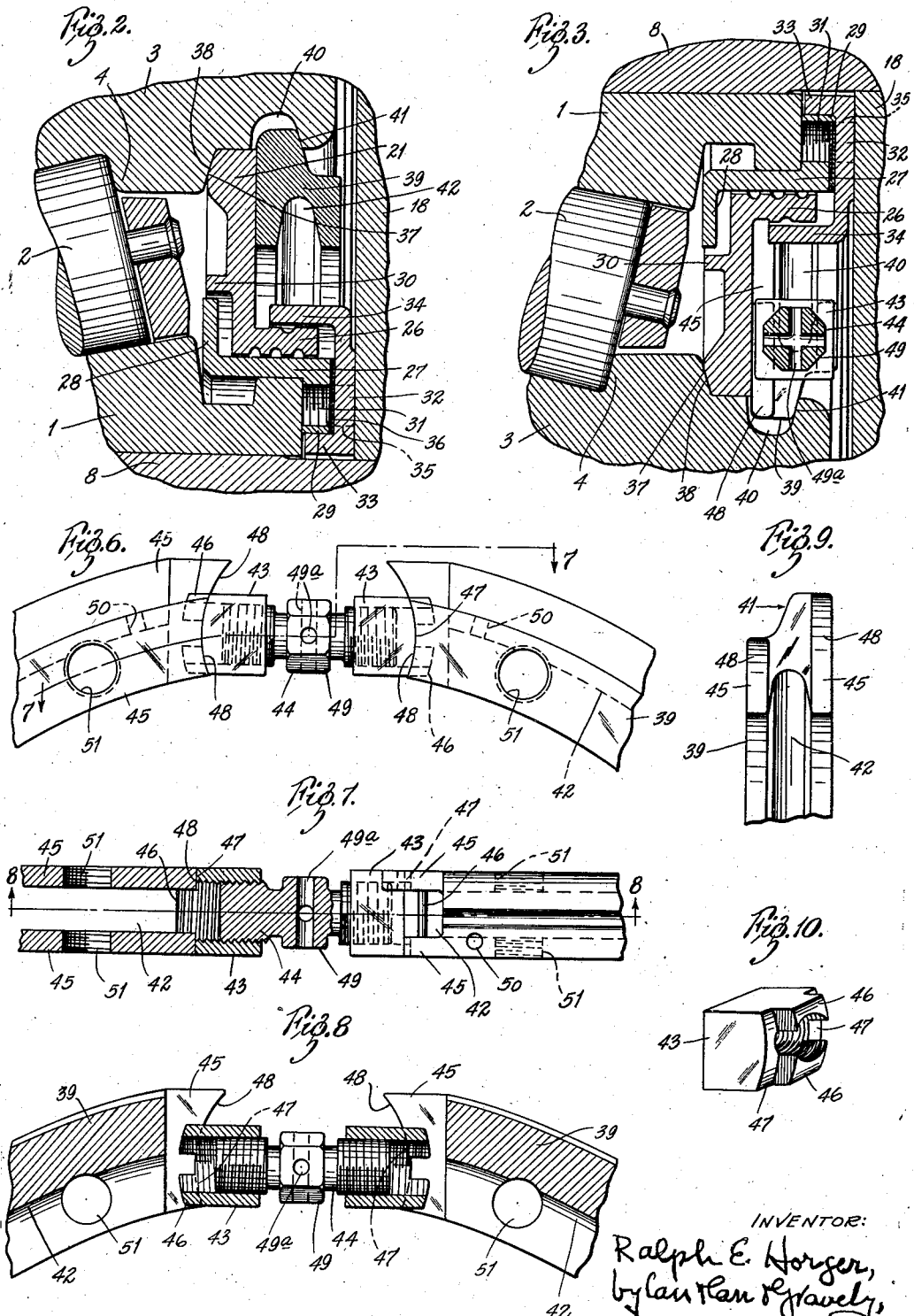

Patented Feb. 24, 1942

2,274,201

UNITED STATES PATENT OFFICE 2,274,201

LOCOMOTIVE ROD BEARING SEAL

Ralph E. Horger, Canton, Ohio, assignor to The Timken Roller Bearing Company, Canton, Ohio, a corporation of Ohio Application January 20, 1940, Serial No. 314,776

4 Claims. (Cl. 286—5)

This invention relates to bearings, particularly locomotive rod bearings, and has for its principal object to improve the oil retaining end closure construction of the bearing shown in my copending application Serial No. 262,863, now Patent No. 2,241,350, issued May 6, 1941. The invention consists in the parts and in the arrangements and combinations of parts hereinafter described and claimed.

In the accompanying drawings, which form part of this specification and wherein like symbols refer to like parts wherever they occur, Fig. 1 is a central horizontal section through a locomotive rod bearing embodying my invention, Fig. 2 is an enlarged fragmentary horizontal section through said bearing in the region of the outermost end closure and the split locking ring therefor, Fig. 3 is a section similar to Fig. 2, the section being taken through the split portion of said locking ring, Fig. 4 is a fragmentary section similar to Fig. 2 in the region of the inner end closure and the split locking ring therefor, Fig. 5 is a cross-section on the line 5—5 of Fig. 1, Fig. 6 is a fragmentary outer end view of one of the locking rings and the spreading device therefor, Fig. 7 is a section on the line 7—7 in Fig. 6, Fig. 8 is a section on the line 8—8 in Fig. 7, Fig. 9 is a fragmentary view of one of the spreading-block receiving ends of said ring; and Fig. 10 is a perspective view of one of the ring spreading or expanding blocks.

In the accompanying drawings, my invention is shown embodied in a double taper locomotive rod bearing comprising two cones or inner raceway members 1 whose raceways taper toward each other, caged circular series or rows of tapered rollers 2 for the raceways of the respective cones, and a single cup or outer raceway member 3 having tapered raceways therein for the respective series of rollers. The raceways of the cup 3 are depressed to form thrust shoulders 4 for the large ends of the rollers and guide shoulders 5 for the small end thereof. A replaceable steel sleeve 6 having a hard outside diameter is pressfitted or shrunk on the cup 3. The outer end of the sleeve 6 is disposed flush with the corresponding end of the cup 3 and the inner end of said sleeve abuts against an annular shoulder 7 provided therefor on said cup near the inner end thereof.

The bearing cones 1 are mounted with a press-fit on a crank pin 8 of a main driving wheel 9 of a locomotive, with a suitable spacing sleeve 10 mounted on said pin between said cones. The main rod 11, front side rod 12 and rear side rod 13 have their adjacent ends journaled on the steel sleeve 6 of the single outer raceway member 4. A suitable spacing sleeve 14 is mounted on the cup sleeve 6 between the main rod 11 and the front side rod 12, an externally grooved outer abutment ring 15 is sleeved on the outer end of said cup sleeve adjacent to the outer face of the rear side rod 13 and an abutment ring 16 is sleeved on the cup between an annular shoulder 17 thereon and the inner face of said front side rod. The double taper bearing, together with the rod ends and spacing sleeve 14 and abutment rings 15 and 16 therefor are held on the crank pin 8 by the eccentric crank 18 of the locomotive valve gear (not shown), said crank being rigidly secured to the outer end of said crank pin by means of a pin 19.

The annular space 20 between the inner and outer raceway members of the bearing is closed at the outer and inner ends thereof by means of end closure members 21 and 22, respectively. This annular space 20 is supplied with lubricant from an axial reservoir 23 in the crank pin 8 through radial passageways 24 therein that open into said space through radial holes 25 in the spacing sleeve 10 for the cones or inner raceway members 1 of the bearing.

The outermost end closure member 21 comprises an annular plate having an outwardly extending internally and externally grooved hub 26 that closely encircles a sleeve 27 that is pressfitted on the outer end of the outermost bearing cone and terminates at its inner end in an outwardly extending oil flinger flange 28 and at its outer end in an inwardly extending stop flange 29. The oil flinger flange 28 of the sleeve 27 is spaced inwardly of the end closure plate 21, which has a projecting annular rib 30 on its inner face that overhangs and is slightly spaced from the peripheral edge of said flinger flange; and the stop flange 29 of said sleeve overhangs and abuts flatwise against the outer end of the outermost cone and has two circumferentially spaced holes 31 extending therethrough that are threaded to receive pulling screws (not shown). An annular plate 32 is disposed between the outer end flange 29 of the sleeve 27 and the eccentric crank 18 and has an inwardly extending hub portion 33 that is sleeved on the crank pin 8 and fits snugly in the opening defined by the inner periphery of said flange. This annular plate 32 is provided with an inwardly extending outer peripheral flange 34 that overlaps the outwardly extending hub portion 26 of the annular closure plate 21. The annular plate 32 has two holes 35 extending therethrough that are threaded to receive pulling screws (not shown) these holes being offset circumferentially with respect to the holes 31 in the stop flange 29 of the sleeve 27; and shims 36 are interposed between said annular plate and said stop flange for obtaining proper adjustment of the bearings.

The outermost end closure 21 has a beveled annular inner face 37 that seats against a beveled valve type seat 38 provided therefor in the bore of the outer raceway member 3. Said end closure is held tightly against its beveled seat or annular abutment shoulder 38 by means of a split retaining and clamping ring 39 that seats within an annular groove 40 provided therefor in the bore of the outer raceway member outwardly of said seat. The outer wall of the groove 40 and the face of the split lock ring 39 cooperating therewith are inclined, as at 41, in the direction of the end closure so that expansion of said ring will move the same inwardly against the outer end face of said end closure and thus press the latter tightly against its beveled seat 38 in the outer raceway member. As shown in the drawing, the locking ring is grooved, as at 42, around its inner periphery to reduce the weight and increase the flexibility thereof.

The split retaining or locking ring 39 is mechanically expanded into tight engagement with the inclined outer wall of the internal groove 40 provided therefor in the outer raceway member 3 by means of a spreading device comprising a pair of blocks 43 located between the spaced ends of said ring and a screw 44 that is threaded into bores provided therefor in the respective blocks. This spreading screw is provided at one end with a right hand thread and at the other end with a left hand thread, whereby said blocks are caused to move towards or away from each other, depending on the direction in which the screw is operated. At the spaced ends of the split ring 39, the bottom of the internal groove 42 thereof terminates short of the side walls thereof forming a pair of spaced parallel lugs or wings 45, between which are snugly received tongues 46 formed on the remote ends of the respective blocks 43. These tongues form shoulders 47 in the blocks that are convexly curved and seat in concave seats 48 provided therefor in the shoulder opposing ends of the wings 45 at the spaced ends of said ring. The adjusting screw 44 has its middle portion 49 shaped to receive a wrench; and said middle portion and the portions of the split ring on opposite sides of said blocks are provided with holes 49a and 50 adapted to receive a wire (not shown) for locking the screw in the desired position of rotary adjustment. The locking ring is provided on opposite sides of the split therein with threaded holes 51 adapted to be engaged by threaded pins (not shown) to facilitate drawing the ends of said ring together when it is mounted in and removed from the groove 40 in the outer raceway member 3. The blocks 43 are self-centering in the concave seats 48 in the wings 45 at the ends of the split locking ring 39 and are held in place by the central tongues 46 that extend into the spaces between said wings.

The innermost closure member 22 comprises an annular plate having an inwardly extending peripheral flange 22a that fits within the bore of the outer raceway member 3 and terminates in a beveled end 37a that seats against a beveled valve type seat or abutment shoulder 38a formed in said bore. This closure 22 is held to its seat by a split locking ring 39a, similar to the locking ring 39, that seats in a groove 40a similar to the groove 40, and is expanded by blocks 43a similar to the blocks 43. Mounted in the angle shaped inner closure plate 22 is a suitable oil seal including a continuous roll of leather or other flexible material 52 bonded to the shell 53 of said seal and held in contact with the cylindrical outer peripheral surface of the inner end portion of the innermost cone by means of a garter type spring 54.

By the arrangement described, the end closure plates are held by the split locking rings therefor tightly against their valve type seats in the bore of the outer raceway member of the bearing and thus prevent leakage of lubricant through the joints between said end closures and said outer raceway member; and the removable rod abutment rings serve to prevent expansion or distortion of said outer raceway member when the said locking rings are forcibly expanded into their grooves. The external peripheral grooves in the outermost abutment ring lightens the weight thereof and improve the appearance thereof, while the internal annular grooves in the split locking rings not only reduce the weight thereof but also increase their flexibility and prevent permanent set thereof when the rings are expanded into the grooves in the bore of the outer raceway member. When the locking rings are thus expanded against the beveled walls of the grooves provided therefor in the bore of the outer raceway member, said rings are forced inwardly against the closures and thus cause them to seat tightly against the seats provided therefor in the outer raceway member and thus prevent leakage of oil between the said closures and said outer raceway member. At the same time, the oil flinger and labyrinth effect of the sleeves and hub portion of the outermost end closure and the close fit of the flexible seal carried by the innermost end closure prevent the escape of oil from and the entry of dust into the bearing space through the joints between said end closures and the inner raceway members. The end closures are entirely separate from the rod abutment rings, whereby either of said rod abutment rings and end closures may be removed and replaced independently of the other.

The invention is not limited to the particular locomotive rod bearing construction shown and described.

What I claim is:

1. Closure means for the annular space between relatively rotatable inner and outer members comprising an annular end closure interposed between said members adjacent to one end thereof, said outer member having an internal annular abutment for said closure, a split retaining ring mounted in said outer member for holding said closure against said abutment; said closure having an internally and externally grooved hub projecting from the outer end face thereof and an annular rib on the inner end face thereof, said hub surrounding the adjacent end portion of said inner member, a sleeve press-fitted on said end portion of said inner member and extending through said hub, said sleeve having an inwardly extending stop flange at its outer end overhanging and abutting endwise against the outer end face of said inner member, and an outstanding annular flange at its inner end spaced inwardly of the inner face of said closure with its peripheral edge terminating close to but clear of said annular rib, and an annular member having a hub portion supported in the opening defined by the inwardly extending flange at the outer end of said sleeve and a peripheral flange encircling the hub of said end closure.

2. Closure means for the annular space between relatively rotatable inner and outer members comprising an annular end closure interposed between said members adjacent to one end thereof, said outer member having an internal annular abutment for said closure, a split retaining ring mounted in said outer member for holding said closure against said abutment, said closure having an internally and externally grooved hub projecting from the outer face thereof and an annular rib on the inner face thereof, said hub surrounding the adjacent end portion of said inner member, a sleeve pressfitted on said end portion of said inner member and extending through said hub, said sleeve having an inwardly extending stop flange at the outer end thereof disposed in abutting relation to the outer end face of said inner member and an outstanding annular flange at its inner end spaced inwardly of said inner face of said closure with its peripheral edge terminating close to but clear of said annular rib, an annular member having a hub fitting in the opening defined by the outer end flange of said sleeve and a peripheral flange encircling the hub of said closure, and annular adjusting shims sleeved on said hub of said annular member and clamped between said annular member and said outer end flange of said sleeve.

3. Closure means for the annular space between relatively rotatable inner and outer members comprising an annular end closure interposed between said members adjacent to one end thereof, said outer member having a continuous internal annular groove and an internal annular abutment for said closure inwardly of said groove, a split retaining ring mounted in said groove for holding said end closure against said abutment, said groove and ring having continuous cooperating portions adapted to force said ring against said closure when said ring is expanded into said groove, said ring having a circumferential groove extending around the inner periphery thereof, and means interposed between the ends of said split ring for expanding the same into said groove, the side walls of the inner peripheral groove of said ring being continued beyond the bottom of said groove at the ends of said rings to form pairs of spaced wings, said means comprising a pair of blocks positioned respectively between said pairs of wings and means for spreading said blocks apart, said blocks having arcuate shoulders at their remote ends, and the ends of said wings having arcuate seats for the arcuate ends of the respective blocks.

4. Closure means for the annular space between relatively rotatable inner and outer members comprising an annular end closure interposed between said members adjacent to one end thereof, said outer member having a continuous internal annular groove and an internal annular abutment for said closure inwardly of said groove, a split retaining ring mounted in said groove for holding said end closure against said abutment, said groove and ring having continuous cooperating portions adapted to force said ring against said closure when said ring is expanded into said groove, said ring having an annular groove extending around the inner periphery thereof, side walls of the inner peripheral groove of said ring extending beyond the bottom of said groove at the ends of said ring to form pairs of spaced parallel wings, a pair of blocks positioned between but unsecured to the ends of said split ring and extending respectively between said pairs of wings, and a screw having a right hand thread engaging one block and a left hand thread engaging the other block, said blocks having convex shoulders at their remote ends, and the ends of said wings having concave seats for the convex shoulders of the respective blocks.

RALPH E. HORGER.